United States Patent
Gutt et al.

(10) Patent No.: US 9,344,147 B1
(45) Date of Patent: May 17, 2016

(54) APPENDING BURSTS TO CREATE A SUPER BURST FOR IMPROVED BUILDING PENETRATION

(75) Inventors: Gregory M. Gutt, Ashburn, VA (US); David A. Whelan, Newport Coast, CA (US)

(73) Assignee: THE BOEING COMPANY, Chicago, IL (US)

( * ) Notice: Subject to any disclaimer, the term of this patent is extended or adjusted under 35 U.S.C. 154(b) by 623 days.

(21) Appl. No.: 13/246,705

(22) Filed: Sep. 27, 2011

Related U.S. Application Data

(63) Continuation-in-part of application No. 12/780,365, filed on May 14, 2010.

(51) Int. Cl.
*H04L 27/00* (2006.01)
*H04B 3/54* (2006.01)
*H04L 25/49* (2006.01)
*H04L 1/00* (2006.01)

(52) U.S. Cl.
CPC ............... *H04B 3/54* (2013.01); *H04L 1/0009* (2013.01); *H04L 25/4902* (2013.01); *H04L 1/0041* (2013.01); *H04L 25/49* (2013.01)

(58) Field of Classification Search
CPC .... H04B 3/54; H04L 25/4902; H04L 1/0009; H04L 1/0041; H04L 25/49
USPC .......................................................... 375/259
See application file for complete search history.

(56) References Cited

U.S. PATENT DOCUMENTS

| | | | |
|---|---|---|---|
| 3,772,475 A | * | 11/1973 | Loffreda ........................ 370/324 |
| 4,330,859 A | * | 5/1982 | Takada .......................... 370/318 |
| 6,285,318 B1 | * | 9/2001 | Schoen et al. ............ 342/357.37 |
| 7,042,392 B2 | | 5/2006 | Whelan et al. |
| 7,289,473 B1 | * | 10/2007 | Padovani et al. ............... 370/332 |
| 7,372,400 B2 | | 5/2008 | Cohen et al. |
| 7,388,845 B2 | * | 6/2008 | Laroia et al. ................... 370/311 |
| 7,453,391 B1 | * | 11/2008 | McIntire et al. ................. 342/57 |
| 7,468,696 B2 | | 12/2008 | Bornholdt |
| 7,489,926 B2 | | 2/2009 | Whelan et al. |
| 7,554,481 B2 | | 6/2009 | Cohen et al. |
| 7,579,986 B2 | | 8/2009 | DiEsposti |
| 7,579,987 B2 | | 8/2009 | Cohen et al. |
| 7,583,225 B2 | | 9/2009 | Cohen et al. |
| 7,619,559 B2 | | 11/2009 | DiEsposti |
| 7,688,261 B2 | | 3/2010 | DiEsposti |
| 2005/0116860 A1 | * | 6/2005 | Kishimoto et al. ....... 342/357.12 |
| 2005/0159891 A1 | | 7/2005 | Cohen et al. |
| 2007/0161385 A1 | * | 7/2007 | Anderson ...................... 455/502 |
| 2008/0059059 A1 | | 3/2008 | Cohen et al. |
| 2008/0143605 A1 | | 6/2008 | Bornholdt |
| 2008/0146246 A1 | | 6/2008 | Bornholdt |
| 2009/0174597 A1 | | 7/2009 | DeLellio et al. |

(Continued)

*Primary Examiner* — Helene Tayong
(74) *Attorney, Agent, or Firm* — Vista IP Law Group LLP; Cynthia A. Dixon

(57) ABSTRACT

A system, method, and apparatus according to various embodiments are disclosed herein to enable a signal in space scheme to have improved signal penetration within buildings and other attenuated environments. The disclosed enhanced signal delivery method transmits multiple bursts in a successive pattern that is known by a receiver on the ground. This successive transmission pattern of bursts effectively creates a longer correlation sequence that allows a receiver to more readily be able to pull the signal out of the noise and, thus, allows a receiver located in a more stringent, attenuated environment to receive a signal where it previously was unable to do so.

24 Claims, 10 Drawing Sheets

(56) References Cited

U.S. PATENT DOCUMENTS

| 2009/0228210 | A1 | 9/2009 | Gutt |
| 2009/0315764 | A1 | 12/2009 | Cohen et al. |
| 2009/0315769 | A1* | 12/2009 | Whelan et al. ........... 342/357.09 |
| 2010/0171652 | A1 | 7/2010 | Gutt et al. |
| 2014/0126455 | A1* | 5/2014 | Li et al. ......................... 370/312 |

* cited by examiner

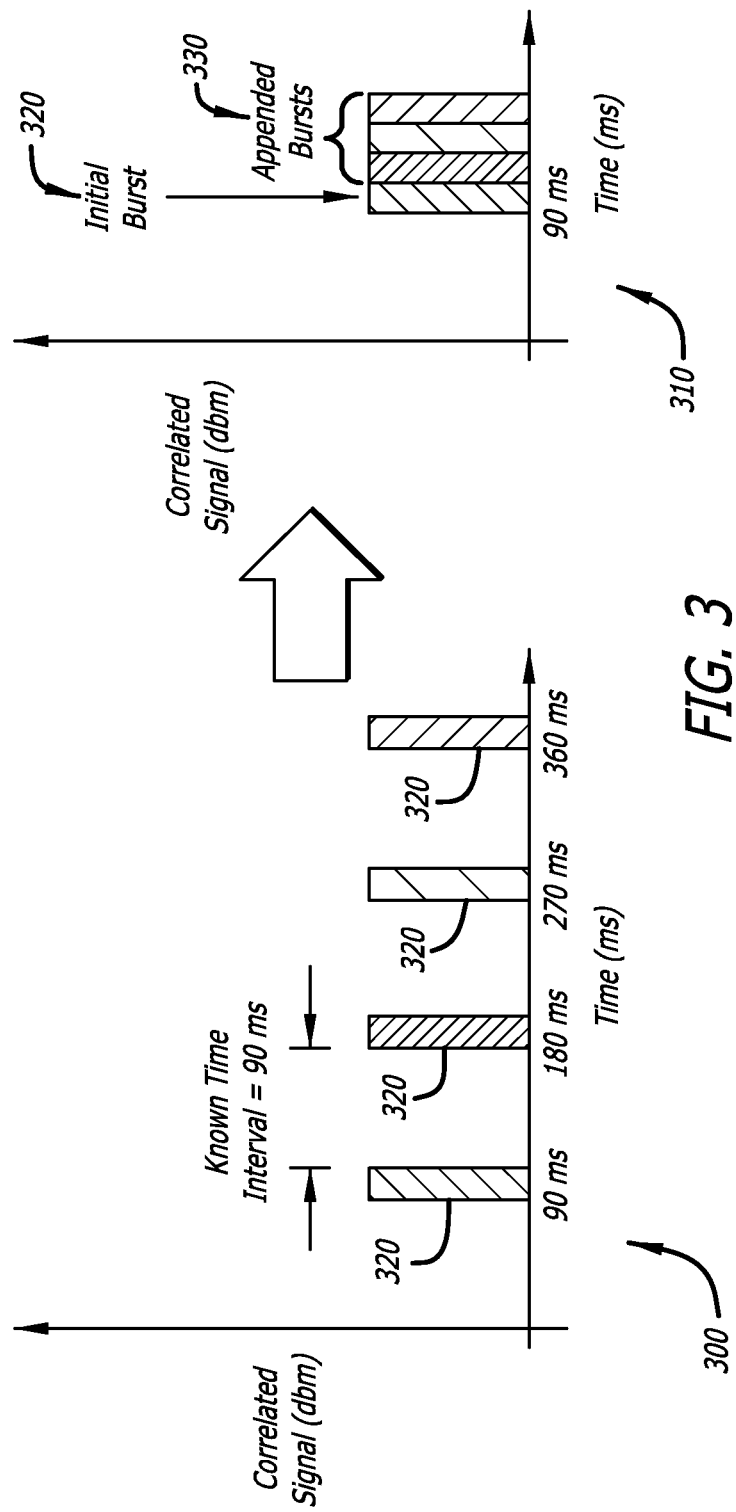

APPENDING BURSTS TO CREATE A SUPER BURST FOR IMPROVED BUILDING PENETRATION

CROSS-REFERENCE TO RELATED APPLICATION

This application is a Continuation-In-Part application of, and claims the benefit of U.S. patent application Ser. No. 12/780,365, filed May 14, 2010, which is hereby incorporated by reference in its entirety.

BACKGROUND

The present disclosure relates to appending bursts. In particular, it relates to appending bursts to create a super burst for improved building penetration.

SUMMARY

The present disclosure relates to a method, system, and apparatus for appending bursts to create a super burst for improved building penetration. In particular, the present disclosure teaches a method for signal encoding that involves transmitting, with at least one transmission source, at least one burst signal, where at least one burst signal includes at least one transmit bit. The method further involves receiving, with at least one receiving source, at least one burst signal. Also, the method involves processing, with at least one processor, at least one transmit bit from at least one burst signal received to obtain at least one information bit. In one or more embodiments, the method further involves appending two or more of at least one burst signal to create a super burst signal.

In one or more embodiments, two or more of the burst signals are transmitted by the same transmission source. In some embodiments, two or more of the burst signals are transmitted by different transmission sources. In at least one embodiment, two or more of the burst signals are transmitted on the same frequency. In one or more embodiments, two or more of the burst signals are transmitted on different frequencies.

In some embodiments, at least one user is associated with at least one receiving source. In at least one embodiment, at least one user is an entity and/or a person. In one or more embodiments, at least one user is stationary and/or mobile. In one or more embodiments, at least one transmission source is employed in at least one satellite and/or at least one pseudo-satellite. In some embodiments, at least one satellite is a Lower Earth Orbiting (LEO) satellite, a Medium Earth Orbiting (MEO) satellite, and/or a Geosynchronous Earth Orbiting (GEO) satellite.

In one or more embodiments, the disclosed method employs an Iridium LEO satellite constellation, where each of the satellites in the constellation has an antenna geometry that transmits forty-eight (48) spot beams with a distinctive spot beam pattern. In at least one embodiment, at least one burst signal may be transmitted from at least one of the Iridium satellites in the constellation. The forty-eight (48) spot beams of an Iridium satellite may be used to transmit localized burst signals containing transmit bits to receiving sources located on or near the Earth's surface. It should be noted that when employing one of the above-described Iridium LEO satellites, the burst signal power is sufficiently strong enough to allow for the signal to penetrate into an indoor environment. This allows for the disclosed method to be used for many indoor applications.

In at least one embodiment, at least one receiving source is employed in a cell phone, a personal digital assistant (PDA), a personal computer, a computer node, an internet protocol (IP) node, a server, a router, a gateway, a Wi-Fi node, a network node, a Wi-Max node, a 2G node, a 3G node, a 4G node, a Bluetooth node, and/or a Zigbee node. In some embodiments, at least one processor is employed in a cell phone, a personal digital assistant (PDA), a personal computer, a computer node, an internet protocol (IP) node, a server, a router, a gateway, a Wi-Fi node, a network node, a Wi-Max node, a 2G node, a 3G node, a 4G node, a Bluetooth node, and/or a Zigbee node.

In one or more embodiments, two or more of the burst signals are transmitted over the same time interval. In some embodiments, two or more of the burst signals are transmitted over different time intervals, where the different time intervals are predetermined and/or random. In at least one embodiment, at least one information bit corresponds to a sequence of two or more of the transmit bits that are received in chronological order and/or not in chronological order. In some embodiments, the sequence of the transmit bits that corresponds to at least one information bit is predetermined and/or is random.

In one or more embodiments, a system for signal encoding involves at least one encoding processor, at least one transmission source, at least one receiving source, and at least one processor. In one or more embodiments, at least one encoding processor is for encoding data into at least one transmit bit. In at least one embodiment, at least one transmission source is for transmitting at least one burst signal, wherein at least one burst signal includes at least one transmit bit. In some embodiments, at least one receiving source is for receiving at least one burst signal. In one or more embodiments, at least one processor is for processing at least one transmit bit from at least one burst signal to obtain at least one information bit.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

FIG. 3 are graphs respectively illustrating the burst pattern and the combined signal post signal processing, in accordance with at least one embodiment of the present disclosure.

DESCRIPTION

Figure 1:
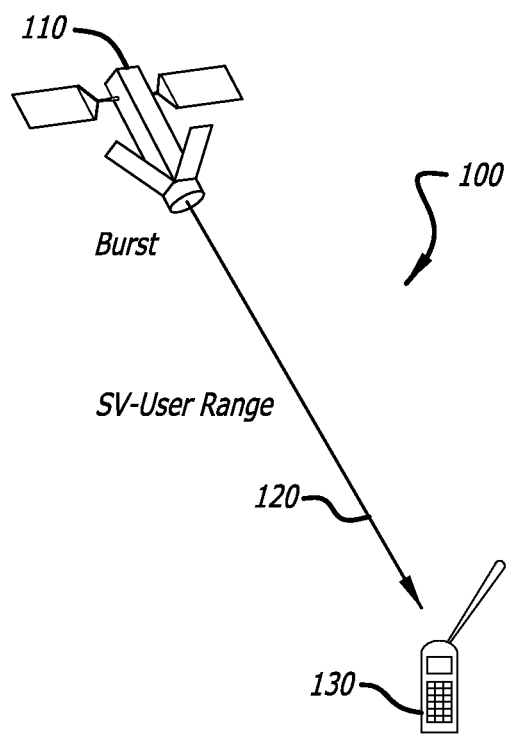
FIG. 1 is a schematic diagram of the disclosed system for appending bursts to create a super burst for improved building penetration, in accordance with at least one embodiment of the present disclosure.

The methods and apparatus disclosed herein provide an operative system for appending bursts to create a super burst for improved building penetration. Specifically, this system relates to encoding data, which is in the form of information bits, into transmit bits that are transmitted in burst signals. After the burst signals are received, the transmit bits of the burst signals are processed in order to determine the information bits of the data. For the disclosed system, LEO satellites from the Iridium constellation are employed as the transmission sources to transmit the burst signals to Earth. Since Iridium satellites have higher signal power and are located closer to the Earth's surface than other types of satellites, the Iridium satellites are able to successfully transmit signals through attenuated environments, thereby making the disclosed system very useful for applications requiring the transmission of signals indoors.

Existing navigation and timing signals provided by various existing satellite navigation systems often do not provide satisfactory system performance. In particular, the signal power, bandwidth, and geometrical leverage of such navigation and timing signals are generally insufficient to meet the needs of many demanding usage scenarios.

Existing navigation and timing approaches based on, for example, global positioning system (GPS) signals may not typically be available to a navigation user in many instances. Typically, a GPS receiver must receive at least four simultaneous ranging sources to permit three dimensional positioning and accurate time transfer. However, GPS signals often provide insufficient, low-signal power or geometry to be able to readily penetrate urban canyons or walls of buildings. Other navigation approaches based on, for example, cellular telephone or television signals typically lack vertical navigation information.

Existing systems have attempted to address indoor navigation deficiencies by the use of various approaches, such as internal navigation systems, specialized beacons, and highly sensitive GPS systems. However, inertial navigation systems drift and are expensive. Beacons require specialized fixed assets that are expensive and not standardized and, thus, having only specialized utility. Sensitive GPS systems often do not perform to user expectations due to the weakness of the GPS signals in indoor environments.

This present disclosure relates generally to electronic communication, which may be used for positioning, navigation, and timing systems, and more particularly to signal encoding techniques, which may be used in wireless communication systems, such as satellite communication systems to improve signal penetration, signal-to-noise ratio, and/or anti-jam capabilities of the signal.

In particular, the present disclosure teaches a system and method to couple together separate bursts transmitted from a transmitter to effectively make one longer burst, which contains more information (i.e. contains more information bits). With the use of correlation techniques, the net received signal is more detectable in noisy conditions, such as in an indoor environment or in a jammed environment. In particular, the anti-jam capability of this system may be a critical element for civilian and military operations, including those for GPS based systems.

GPS is a spread-spectrum system that comprises low power signals that are received from medium Earth orbiting (MEO) satellites by a receiver on the ground. A jammer can focus its power to jam GPS signals that are in a vicinity of a location of potential critical importance to civilian and/or military applications. With systems such as High Integrity GPS (iGPS), the Iridium Constellation is used to aid and enhance GPS capabilities. Iridium comprises a low Earth orbiting (LEO) satellite constellation. Iridium's satellites produce higher powered signals and are in closer proximity to the Earth than MEO satellites or geostationary Earth orbiting (GEO) satellites. These features of Iridium allow a receiver on the ground to be in harsh signal environments and still receive the signal, thereby making the signal more difficult to jam. In one or more embodiments, the system of the present disclosure employs at least one Iridium satellite as a transmission source to further improve upon this LEO signal advantage. However, it should be noted that the disclosed system may employ other different communication architectures to achieve similar benefits.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

FIG. 1 is a schematic diagram of the disclosed system 100 for appending bursts 120 to create a super burst for improved building penetration, in accordance with at least one embodiment of the present disclosure. In this figure, a transmission source, which is employed in a satellite 110, is transmitting burst signals 120 in a successive pattern to a receiving source 130. The receiving source 130 is employed in a cellular phone, and is associated with a user, which is an entity or a person. Data, which is in the form of information bits, to be sent from the transmission source (i.e. the satellite 110) via one or more burst signals 120 to the receiving source 130 is encoded by a processor or other means into transmit bits. The processor that performs the encoding of the data is located on the satellite 110, a different satellite, and/or at some terrestrial location. A detailed discussion of exemplary encoding techniques that may be employed by the disclosed system 100 to encode the data is presented below in the Bit Signal Structure for Differentially Encoded Broadcasts Section, which describes FIGS. 6 though 9.

Each burst signal 120 contains one or more transmit bits, and the burst signals 120 may contain the same amount or different amounts of transmit bits. In addition, the satellite 110 may transmit the burst signals 120 over the same time interval, or may transmit the burst signals 120 over varying time intervals. For example, the burst signals 120 may be transmitted over the same time interval of every 90 milliseconds (ms), as is depicted in FIG. 3. Or, conversely, the burst signals 120 may be transmitted over a random pattern of time intervals, such as at 90 ms, 110 ms, 135 ms, and at 180 ms. As such, the time intervals of the transmission of the burst signals 120 may be predetermined time intervals and/or may be randomly determined.

Once the receiving source 130 has received the burst signals 120, a processor processes the transmit bits that are within the burst signals 120 to determine the information bits of the data. Each information bit corresponds to a specific sequence of transmit bits, which may contain one or more transmit bits. The more transmit bits the sequence contains, the greater the likelihood that the information bit will be correctly determined by the processor. It should be noted that the specific sequence of transmit bits may comprise of bits that were transmitted in chronological order and/or not in chronological order in the burst signals 120. For example, if the transmitted sequence of transmit bits is 10100111010, and the bit sequence to be used is in its chronological order, the specific sequence of transmit bits that corresponds to an information bit will be 10100111010. Conversely, if the transmitted sequence of transmit bits is again 10100111010, and the bit sequence to be used is not in its chronological order, the specific sequence of transmit bits that corresponds to an information bit may be, for example, 01111010001 (i.e. a specific bit sequence that comprises the six 1 transmit bits and five 0 transmit bits that were transmitted).

In addition, the specific sequence of transmit bits that corresponds to a specific information bit may change over time, either randomly or by choice. The processor is given a predetermined scheduling of the bit changes, or is made aware real time of the bit changes via a transmission from a ground station or a satellite. A detailed discussion of how the information bits are encoded into transmit bits in the burst signals, and how the processor correlates the transmit bits to the information bits is presented in the descriptions of FIGS. 3 and 4 below.

In FIG. 1, the disclosed system 100 employs an Iridium LEO satellite 110 for the transmission source. However, it should be noted that in other embodiments, the disclosed system 100 may employ different types of satellites or pseudo-satellites for the transmission source. Types of satellites that may be employed by the system 100 include, but are not limited to, various different types of MEO satellites, various different types of GEO satellites, and various different types of LEO satellites. Also, in some embodiments more than one transmission source may be used to transmit the burst signals 120. In addition, in at least one embodiment, more than one receiving source 130 may be employed by the system 100 to receive the burst signals 120. The burst signals 120 may be transmitted on the same frequency or on different frequencies.

Also, in FIG. 1, the receiving source 130 is shown to be employed in a cellular phone. In other embodiments, the receiving source 130 may be employed in other devices or components including, but not limited to, a personal digital assistant (PDA), a personal computer, a computer node, an internet protocol (IP) node, a server, a router, a gateway, a Wi-Fi node, a network node, a Wi-Max node, a 2G node, a 3G node, a 4G node, a Bluetooth node, and a Zigbee node. A user (not shown) is associated with the receiving source 130. The user is an entity and/or a person, and the user may be mobile and/or stationary. In other embodiments, more than one user may be associated with the receiving source 130.

The processor (not shown) of the embodiment of FIG. 1 is employed in the same cellular phone as the receiving source 130. In alternative embodiments, the processor may be employed in a device or a component that is not the same device or component that employs the receiving source 130. In these embodiments, the receiving source 130 will need to utilize a transmitter to send the transmit bits to the device or component that contains the processor for the processing of the transmit bits. Similar to the receiving source 130, in one or more embodiments, the processor may be employed in other devices or components including, but not limited to, a personal digital assistant (PDA), a personal computer, a computer node, an internet protocol (IP) node, a server, a router, a gateway, a Wi-Fi node, a network node, a Wi-Max node, a 2G node, a 3G node, a 4G node, a Bluetooth node, and a Zigbee node.

Figure 2A:
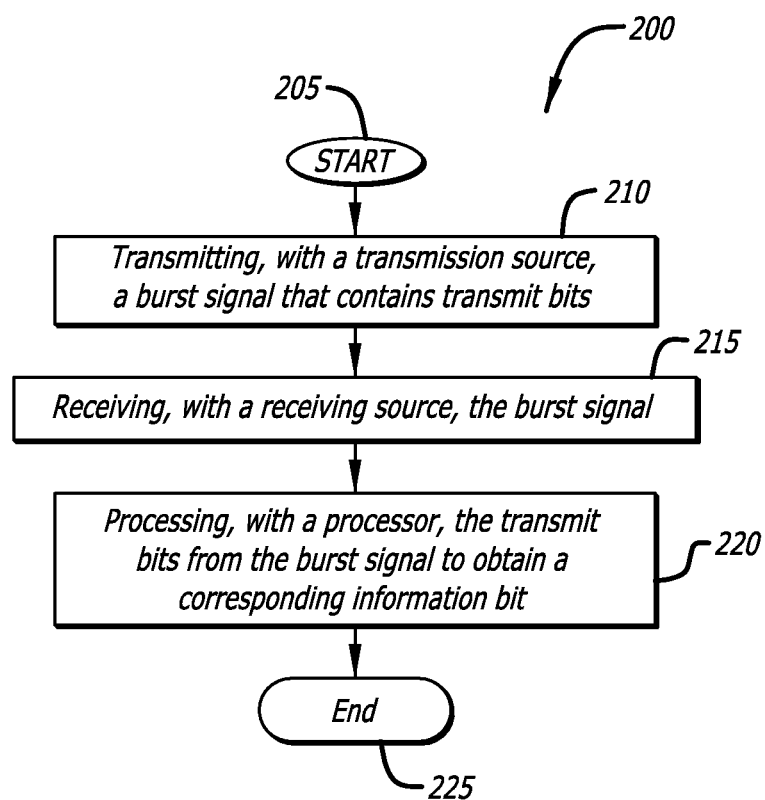
FIG. 2A is a flow diagram of a simplified version of the disclosed method for employing a single burst signal to encode an information bit, in accordance with at least one embodiment of the present disclosure.

FIG. 2A is a flow diagram 200 of a simplified version of the disclosed method for employing a single burst signal to encode an information bit. In this figure, at the start 205 of the method, a transmission source transmits a burst signal that contains transmit bits 210. After the transmission source transmits the burst signal, a receiving source receives the burst signal 215. Once the receiving source has received the burst signal, a processor processes the transmit bits from the burst signal to obtain a corresponding information bit 220. After the processor has obtained the information bit, the method ends 225.

Figure 2B:
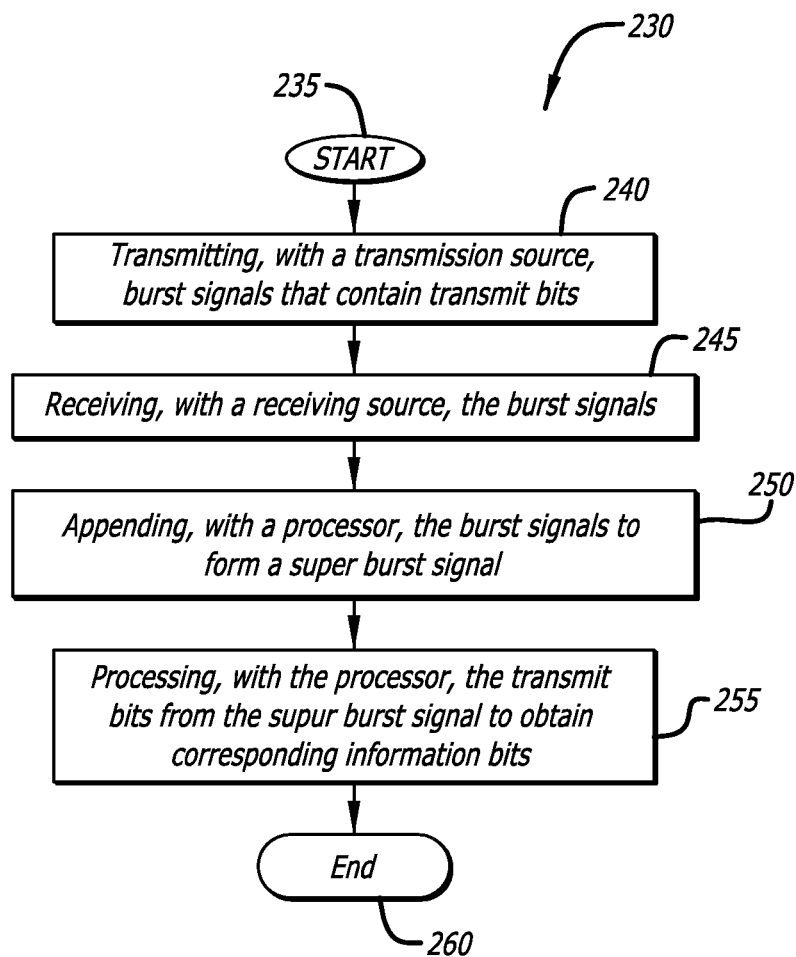
FIG. 2B is a flow diagram of a simplified version of the disclosed method for appending bursts to create a super burst for improved building penetration, in accordance with at least one embodiment of the present disclosure.

FIG. 2B is a flow diagram 230 of a simplified version of the disclosed method for employing multiple burst signals that are appended to create a super burst, in accordance with at least one embodiment of the present disclosure. At this start 235 of the method, a transmission source transmits burst signals that contain transmit bits 240. After the transmission source transmits the burst signals, a receiving source receives the burst signals 245. After the receiving source receives the burst signals, a processor appends the burst signals to form a super burst signal 250. Then, the processor processes the transmit bits from the super burst signal to obtain corresponding information bits 255. After the processor has obtained the information bits, the method ends 260.

FIG. 3 are graphs 300, 310 respectively illustrating the burst pattern and the combined signal post signal processing, in accordance with at least one embodiment of the present disclosure. In this figure, the left graph 300 depicts Iridium L-band frame counts (i.e. bursts 320) that are broadcast every 90 milliseconds (ms), which is a predetermined and known time interval. This known time interval means that the dead time between bursts 320 can be eliminated, and the bursts 320 can be combined together using signal processing to form a super burst 330.

The right graph 310 shows the bursts 320 being combined together to create a super burst 330 post signal processing, thereby effectively making one longer burst 330 with X times the power, where X is the number of the bursts 320. In this four (4) bursts 320 example, the combined bursts 320 create a super burst 330, which effectively has four (4) times the power. It should be noted that in a real-world scenario, the environment will be noisy making the signal processing more complex. However, in at least some embodiments, the receiving source will have a priori knowledge regarding when the appended bursts 320 will be arriving, thereby making the processing of a signal out of the noise more manageable.

Figure 4:
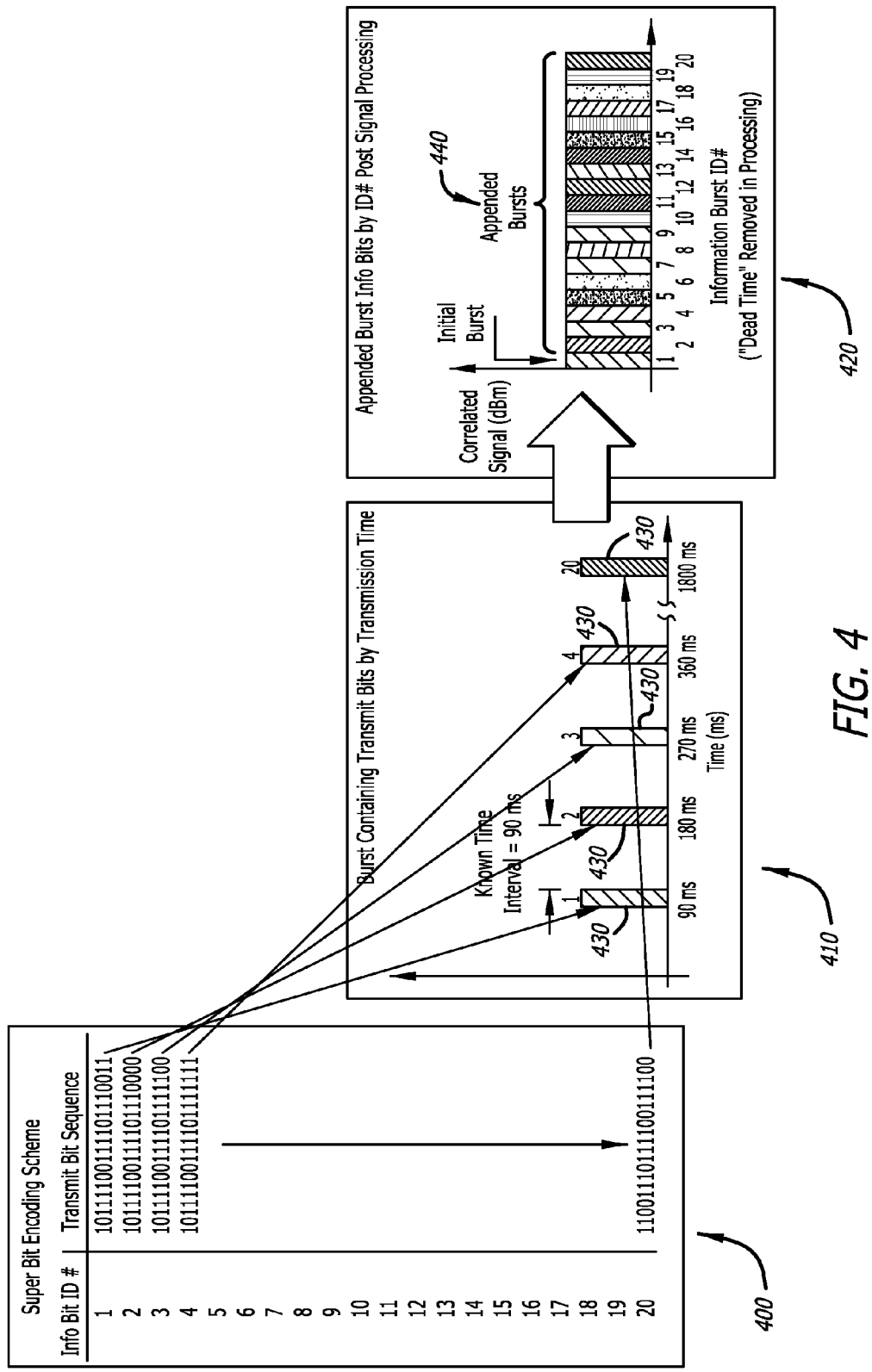
FIG. 4 are a table and graphs respectively illustrating the super bit encoding scheme, the burst pattern, and the combined signal post signal processing that contains the information bit sequence, in accordance with at least one embodiment of the present disclosure.

FIG. 4 are a table 400 and graphs 410, 420 respectively illustrating the super bit encoding scheme, the burst pattern, and the combined signal post signal processing that contains the information bit sequence, in accordance with at least one embodiment of the present disclosure. In this figure, table 400 shows that each information bit (of a total of 20 information bits) of data is encoded to correspond to a specific sequence of twenty (20) transmit bits. For example, the first information bit (i.e. Info Bit ID #1) corresponds to the transmit bit sequence of 10111100111101110011, and the second information bit (i.e. Info Bit ID #2) corresponds to the transmit bit sequence of 10111100111101110000. For this example, the transmit bit sequence for the first information bit corresponds to the first information bit being equal to a one (1), and the transmit bit sequence for the second information bit corresponds to the second information bit being equal to a zero (0).

Table 410 illustrates each transmit bit sequence being transmitted within a single burst 430. As such, in this example, each burst 430 represents one (1) information bit. The bursts 430 in table 410 are shown to be transmitted every 90 ms. After the twenty (20) bursts 430 are received by a receiving source, a processor combines the twenty (20) bursts to creates a super burst 440 that comprises the twenty (20) bursts 430, as shown in table 420. As such, the super burst 440 includes a four-hundred (400) transmit bit sequence. The four-hundred (400) transmit bit sequence is processed by the processor to determine the original twenty (20) information bits of data that were transmitted.

It should be noted that because of various environmental factors as well as other factors, the receiving source may not receive the entire transmit bit sequence for a specific information bit correctly (i.e. the bit error rate of the transmission is not equal to zero). For example, for the first information bit, which is transmitted as 10111100111101110011, the receiving source may actually receive an incorrect transmit bit sequence, such as 00111100111101110011. In this example, one of the transmit bits of the twenty (20) transmit bit sequence were received incorrectly. In this case, the first transmit bit of the sequence was received as a zero (0) instead of as a one (1). The processor may be programmed to have a specific transmit bit error threshold that it will use when processing the received transmit bit sequence to determine the information bit. For example, the processor may be programmed to have a one (1) error bit threshold. If this is the case, even though the transmit bit sequence was received with one of its bits being incorrect, since the processor is programmed to have a (1) error bit threshold, the processor will still determine that the received transmit bit sequence corresponds to the information bit being equal to a one (1).

Figure 5:
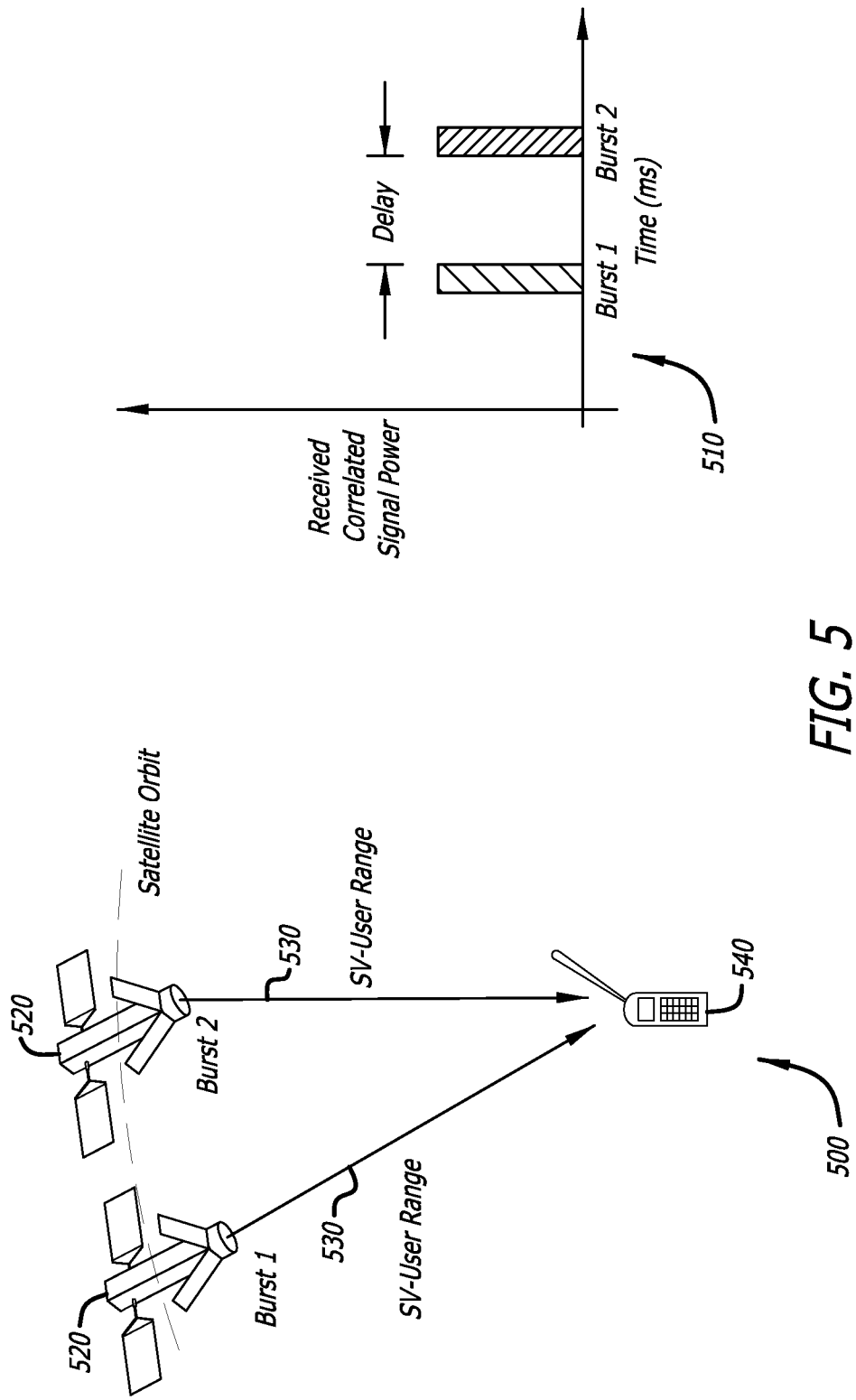
FIG. 5 is schematic diagram depicting the transmit delay and change in the space vehicle to user range, in accordance with at least one embodiment of the present disclosure.

FIG. 5 is schematic diagram 500 and graph 510 depicting the transmit delay and change in the space vehicle to user range, in accordance with at least one embodiment of the present disclosure. In this figure, a single satellite 520 is shown to be transmitting two bursts 530 over a time interval. As can be seen in this figure, as the satellite 520 moves in its orbit over time, the range between the satellite to the receiving device 540 changes in distance. The time delay of the receiving of the bursts 530 ($d$) is a function of the time delay of the transmission of the bursts 530 ($e$) and the satellite-to-receiving source range (f). The effects of the change in the satellite-to-receiving source range can be readily removed by knowledge of the satellite and receiving source positions, and such knowledge must be obtainable or derived by the processor in order to complete the processing of the appended bursts 530.

As previously mentioned, the disclosed system and method provide an operative signal transmission scheme that improves signal penetration within buildings. The example detailed in FIGS. 1 through 5 utilizes the Iridium Satellite Constellation. However, it should be noted that this signal transmission scheme could be utilized by any signal transmission sources to improve signal penetration, signal-to-noise ratio, and/or anti-jam capabilities. The Iridium system employs a signal processing scheme known as differential encoding to encode and transmit quadrature phase shift keyed (QPSK) modulated broadcasts.

The equation for attenuation in some embodiments, which utilize the Iridium constellation, is described as:

$$P = A + B = 30 \text{ dB} + B,$$

where
P=Penetration factor,
A=link margin (i.e. the effective isotropic radiation power (EIRP) of the Iridium satellite transmit signal), and
B=code processing gain based on the bit redundancy.

In the implementation described here, the code processing gain (B) is dependent on the number of redundant bits used in the coding, and is the only possible variable in the penetration factor for this specific architecture example.

In some embodiments, an encoder encodes messages with a processing gain equivalent to:

$$G = N/n,$$

where
G=processing gain,
N=number of transmit bits in the code message, and
n=number of information bits in the message.

The dB conversion factor is equal to 10 log 10(G). A typical burst in this example is 20.32 ms in length, and sends a total of 1016 bits within the burst. More bits are transmitted than required giving additional penetration power based on bit redundancy. This coding technique is referred to herein as super bit encoding (SBE), which is designed to improve the signal detection of messages in noisy environments. Super bit sequences may be constructed using a string of N pseudo-random bits. In one example, thirty-two (32) transmit bits may be used to define every single information bit, thus giving a ratio 32:1. A transmit bit refers to the actual number of bits that are transmitted in the encoded message, whereas the information bit is the encoded bit that is defined in long-form by the transmit bits. The code gain based on bit redundancy can then be calculated by:

$$\text{Code Gain} = 10 \log(32/1) \text{dB} = 15 \text{ dB}$$

Within this architecture, the maximum code gain will be based on using the full 1016 bits for a signal information bit (i.e. a 1016:1 bit ratio):

$$(\text{Max})\text{Code Gain} = 10 \log(1016/1) \text{dB} = 30 \text{ dB}$$

While 1016 bits is the maximum bit count for a burst in this example, it should be clear that this will change depending on the architecture of the bursts. To further expand on this concept, a "super burst" will be defined as the usage of successive bursts to define an information bit. Thus, in this example, coding is not inhibited by the 1016 bit burst limitation.

The goal is to maximize the system's transmission scheme, which can be done by making the broadcast be more than one burst. In another example, 2032 bits may be transmitted per information bit, thus using a system with a 1016 bit max, requiring the second burst to be appended to the first burst for the information burst to be understood.

In order for this implementation of this scheme to work, a receiver needs to know when it should be receiving the appended burst. One example where the receiver has a priori knowledge of the burst schedule, is to provide the user with the broadcast schedule, which may be supplied via a network, such as through a terrestrial network architecture. Secondly, the burst transmission schedule could be changed such that the burst schedule was predictable. Thirdly, bursts themselves could be used to encode the signal such that the next appended burst schedule is understood based on part of the encoded message. If the receiver is aware of when the burst is coming, the bursts can be appended together and treated as one burst. Through burst appending and sequence understanding or sequence predictability, the signal-to-noise ratio (SNR) can continue to increase.

Note that in the case of satellite usage, the range delay will also be a factor that will affect the time between bursts. Range delay can be computed and removed as a factor if the satellite position (i.e. orbit knowledge) and the user's position are known (or can be computed) suitably. Various established techniques exist to support determining the space vehicle (SV)-user range and therefore the time delay between bursts associated with changing range can be suitably removed under appropriate conditions. As previously mentioned above, Time Delay (d) is a function of transmit delay (e) and SV-user range (f), and can be depicted in the equation:

Time Delay=$d=e+f$;

The effects of f are readily removed by knowledge of the SV and user positions.

Considering these improvements, it is possible to arrange, for example, ten (10) bursts to follow in a successive pattern, and B would improve by 10 dB, allowing P to increase accordingly, which allows for a wide array of applications related to improved signal reception and penetration.

Bit Signal Structure for Differentially Encoded Broadcasts

Exemplary differential encoding techniques that may be employed by the disclosed system 100 to encode the data are presented below. These differential encoding techniques may be used in transmitters associated with low Earth orbit (LEO) satellite systems. In some embodiments the differential encoding techniques use preselected codes which exhibit the property of leaving the transmitter's differential encoder in a known logical state. For example, some preselected codes leave the transmitter in the same logical state as it was in prior to transmission. This results in a 1:1 mapping between input data and output data for the differential encoder, which facilitates signal correlation and selection at a receiver.

Figure 6:
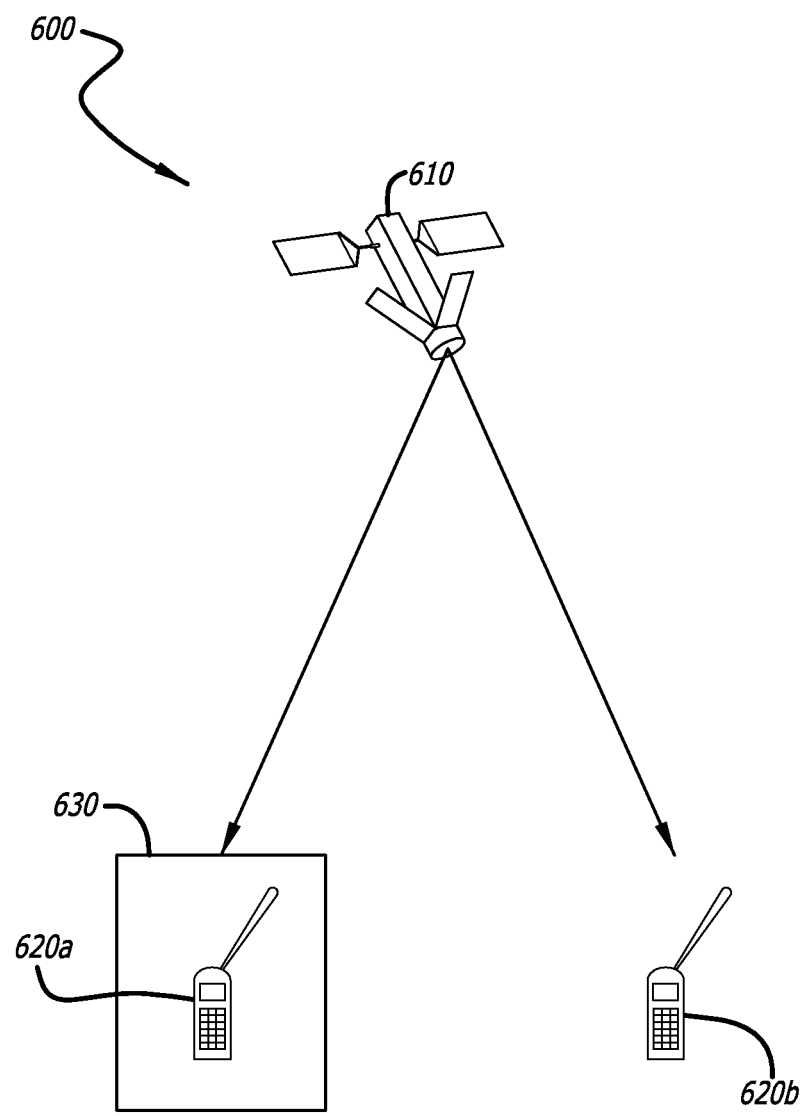
FIG. 6 is a schematic illustration of a low Earth orbit (LEO) satellite communication system that is employing the disclosed bit signal structure for differentially encoded broadcasts, in accordance with at least one embodiment of the present disclosure.

FIG. 6 is a schematic illustration of a low Earth orbit (LEO) satellite communication system 600, according to embodiments. Referring to FIG. 6, in some embodiments a system 600 comprises one or more LEO satellites 610 in communication with one or more receiving devices 620a, 620b, which may be referred to generally by the reference numeral 620.

In some embodiments the LEO satellites 610 may be embodied as satellites in the Iridium satellite constellation. A typical satellite communication system such as Iridium is designed to work under conditions where the satellite signal has a received power above the ambient noise floor.

Receiving devices 620 may be implemented as communication devices such as satellite or cellular phones or as components of a communication or computing device, e.g., a personal computer, laptop computer, personal digital assistant or the like. Alternatively, receiving devices 620 may be implemented as position locating or navigation devices analogous to devices used in connection with the global positioning system (GPS). The GPS system utilizes spread-spectrum access techniques which enables the receivers to pick up a signal even when the received broadcast is below the noise floor. In systems such as GPS, pseudo-random codes are broadcast by satellites, and correlation techniques are used to pull the signal out of the noise.

GPS systems have relatively poor performance within an attenuated (e.g. indoor) environment 630 due to insufficient signal power which has created a need for other systems that can perform better in these environments. Iridium satellites broadcast with significantly more power than GPS transmissions. In an example, a receiver unit configured to work with signals received from a LEO satellite, such as an Iridium satellite, may work with signal levels of less than about 45 dB of attenuation at the antenna of a receiving device 620. Thus, by leveraging the LEO based Iridium satellite, the Iridium-configured receiver unit may operate at about 15-20 dB below where a typical GPS-configured receiver unit would stop working.

Various satellite communication systems, including Iridium, use a differential encoding signal processing scheme to encode and transmit quadrature phase shift keyed (QPSK) modulated broadcasts. During the differential encoding process the In-Phase (I) and Quadrature (Q) modulated bits of a broadcast are re-coded such that the output of the differential encoder is a function of the current I/Q state and the previous I/Q state. Table I is a typical differential encoding scheme used for QPSK systems. Any given message (represented by a string of bits) is differentially encoded before it is broadcast.

TABLE I

Differential Encoding Scheme

| Current Input State | | Previous Output State | | Current Output State | |
|---|---|---|---|---|---|
| I | Q | I | Q | I | Q |
| 0 | 0 | 0 | 0 | 0 | 0 |
| 0 | 0 | 0 | 1 | 0 | 1 |
| 0 | 0 | 1 | 0 | 1 | 0 |
| 0 | 0 | 1 | 1 | 1 | 1 |
| 0 | 1 | 0 | 0 | 1 | 0 |
| 0 | 1 | 0 | 1 | 0 | 0 |
| 0 | 1 | 1 | 0 | 1 | 1 |
| 0 | 1 | 1 | 1 | 0 | 1 |
| 1 | 0 | 0 | 0 | 0 | 1 |
| 1 | 0 | 0 | 1 | 1 | 1 |
| 1 | 0 | 1 | 0 | 0 | 0 |
| 1 | 0 | 1 | 1 | 1 | 0 |
| 1 | 1 | 0 | 0 | 1 | 1 |
| 1 | 1 | 0 | 1 | 1 | 0 |
| 1 | 1 | 1 | 0 | 0 | 1 |
| 1 | 1 | 1 | 1 | 0 | 0 |

The current output of the differential encoding process is a function of the current I/Q state and the previous I/Q state. By way of example, a bit coded message (A) input to a differential encoder will actually be broadcast in a form (B) which can have four different versions (B1, B2, B3, B4) depending on the previous state (C) of the differential encoder. The cases presented in Table II, below are exemplary:

TABLE II

Encoder Transformations

| | |
|---|---|
| Case 1: | |
| A = 00000000 | Pre-encoded message |
| C = 00 | |
| B1 = 00000000 | Broadcast message |
| Case 2: | |
| A = 00000000 | Pre-encoded message |
| C = 01 | Previous state of the differential encoder |
| B2 = 01010101 | Broadcast message |
| Case 3: | |
| A = 00000000 | Pre-encoded message |
| C = 10 | Previous state of the differential encoder |
| B3 = 10101010 | Broadcast message |
| Case 4: | |
| A = 00000000 | Pre-encoded message |
| C = 11 | Previous state of the differential encoder |
| B4 = 11111111 | Broadcast message |

Thus, for any subsequent given message A, there are four possible differentially encoded versions of the message B, which emerges from the differential encoder. The message B is dependent on the previous encoder state C, creating a 1:4 input code (A) to potential output (B) code ratio.

The differential encoding scheme used on Iridium and other communication satellites generates issues in using pseudo-random code sequences and associated correlation detection methods because every desired code, message A, that is inputted into the differential encoder can generate four possible broadcasts. This 1:4 ratio significantly complicates the correlation processing in the user receiver. Instead of searching and correlating for a single group of possible code messages, the receiver instead must search through 4× this number of messages. This increases the memory, processing, and power requirements of the user receiver. Furthermore, it weakens the separation between the codes and increases the likelihood that one code might be mistaken for another in the correlation process.

In one aspect there is described herein systems and methods for differential encoding in which a differential encoder uses a set of codes that, when processed by the differential encoder, places the differential encoder into a known (I,Q) state after an input data stream has been processed. Placing the differential encoder into a known (I,Q) state eliminates the 1:4 ratio of inputs to outputs.

Figure 7:
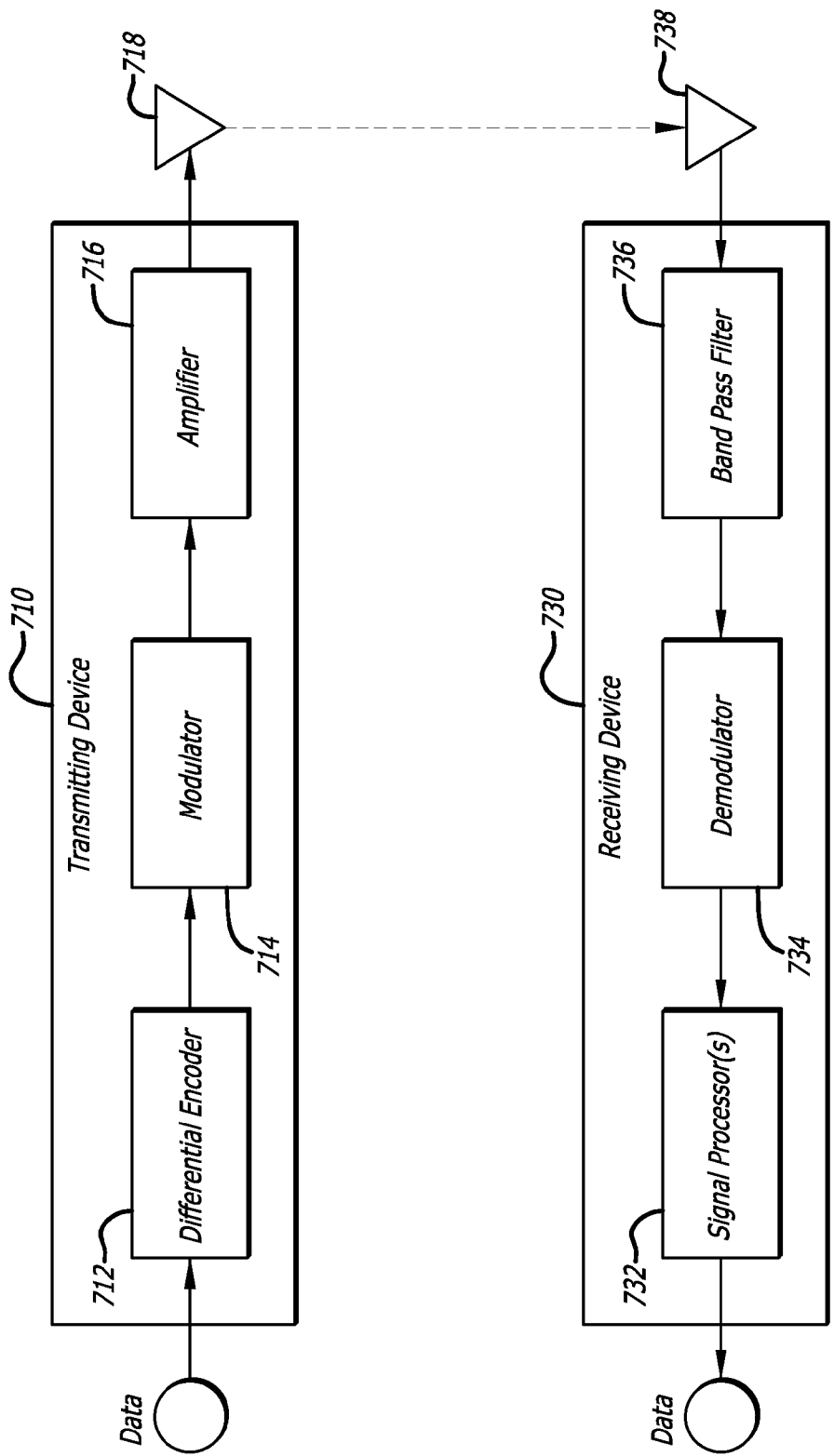
FIG. 7 is a schematic illustration of components of a transmitting device and a receiving device that are used for communicating the disclosed bit signal structure for differentially encoded broadcasts, in accordance with at least one embodiment of the present disclosure.

In some embodiments, methods of the present invention may be implemented in a transmitting device such as, e.g., a transmitter of a LEO satellite such as the satellite 610 depicted in FIG. 6. FIG. 7 is a schematic illustration of components of a transmitting device and a receiving device, according to embodiments. Referring to FIG. 7, in one embodiment a transmitting device 710 comprises a differential encoder 712, a modulator 714, and an amplifier 716. The transmitting device 710 is coupled to an antenna 718. A receiving device 730 comprises one or more signal processor(s) 732, a demodulator 734, and a band pass filter 736. The receiving device 730 is coupled to an antenna 738.

Figure 8:
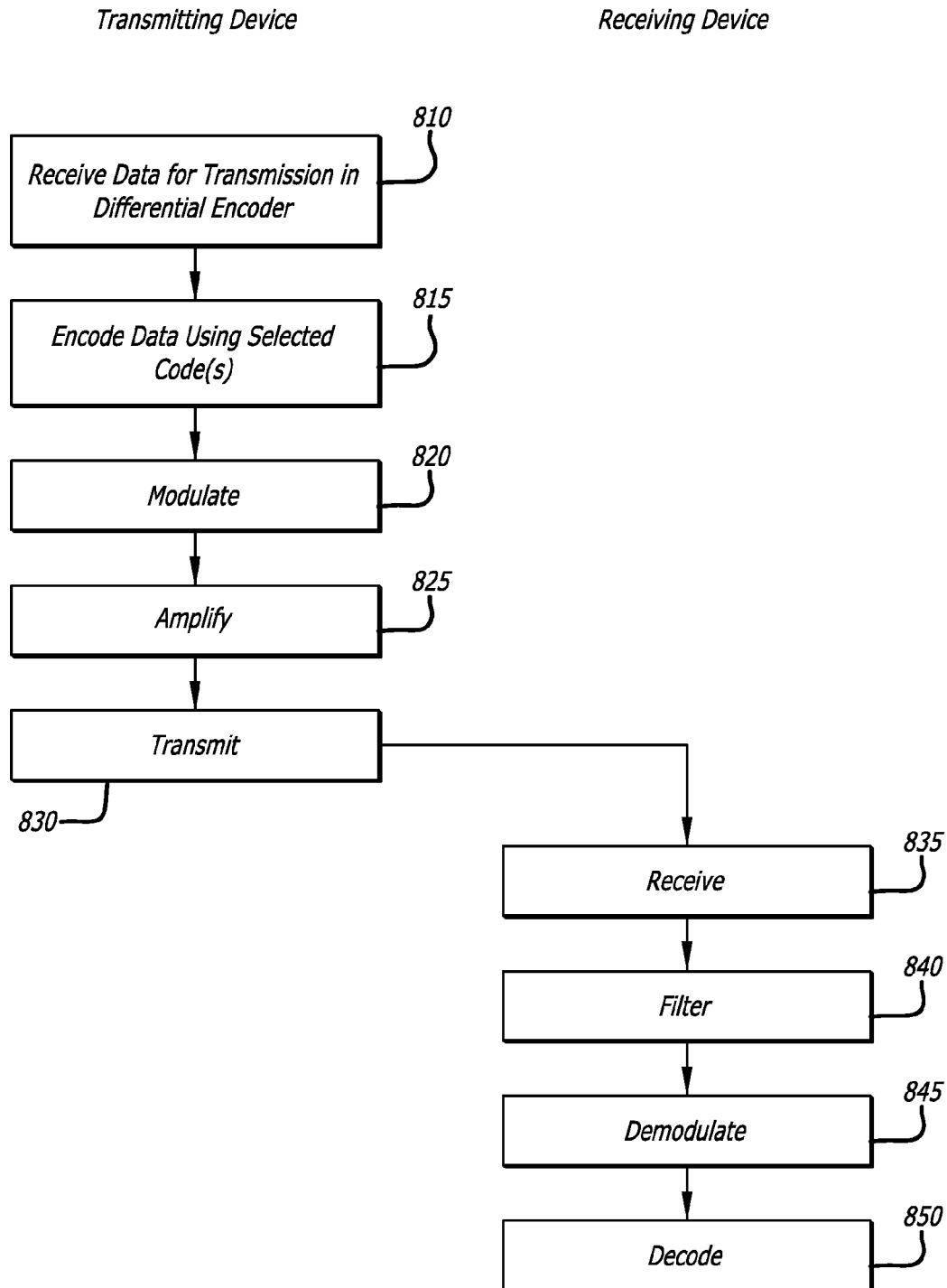
FIG. 8 is a flowchart illustrating operations in a method to implement a bit signal structure for differentially encoded broadcasts, in accordance with at least one embodiment of the present disclosure.

Operations of the transmitting device 710 and the receiving device 730 will be explained with reference to FIG. 7, and with reference to FIG. 8, which is a flowchart illustrating operations in a method to implement a bit signal structure for differentially encoded broadcasts, according to embodiments. Referring to FIGS. 7 and 8, at operation 810 data for transmission is received in the differential encoder 712 of the transmitting device 710.

At operation 815 the data is differentially encoded using selected codes. In some embodiments the differential encoder 712 differentially encodes the data using a set of codes that have the property that when they are transmitted they always leave the differential encoder 712 in a known (I,Q) state, such as (00). This ensures a 1:1 correlation between the input code (A) and the output code (B) of the differential encoder 712, which in turn ensures that the previous message does not present an ambiguity to the current message in spite of the system's differential encoder. Thus, the code word always rotates the differential encoder 712 back to its initial phase (00) in the above example.

At operation 820 the data signal output from the differential encoder is modulated by the modulator 714. The modulated signal is amplified (operation 825) by the amplifier 716 and passed to the antenna 718 for transmission (operation 830).

The broadcast signal is received (operation 835) at the antenna 738 coupled to the receiving device 730. The signal is passed from the antenna 738 to a band pass filter, which filters (operation 840) out undesired frequency ranges, then is demodulated (operation 845) by demodulator 734 and then passed to a signal processor 732. In relevant part, the signal processor 732 may decode (operation 850) the signal to recover the original message. The original message may then be used in a position location process.

In another aspect, the differential encoder 712 may implement a coding technique referred to herein as super bit encoding (SBE), which is designed to improve the signal detection of messages in noisy environments. In some embodiments the differential encoder 712 encodes messages with a processing gain equivalent to:

$$G=N/n;$$

where
G=processing gain,
N=# of bits in the code message,
n=# of information bits in the message.

By way of example, if the 10 message bits are used to represent 1 information bit, the processing gain is equal to 10 (or 10 dB). Where the dB conversion factor is: 10 log 10(G). Super bit sequences may be constructed using a string of N pseudo-random bits, where each code has the correlation properties as previously described. N may be implemented as an integer, such that output sequences from the differential encoder 712 are uncorrelated with each other to the extent possible in order to preserve the differentiation amongst code words.

For example, two SBE bit sequences are set forth below. Each bit sequence uses a 10 bit sequences to represent a 0 or a 1, respectively. As an example of this embodiment, the bit codes presented in Case 1 through Case 4 in Table III below illustrate a 20 bit input code after which four zeros (0000) are appended as a test sequence, A. The four zeros appended to the end of the 20 bit sequence help identify the state C of the differential encoder 712. In addition, D identifies the post-encoded state of the differential encoder 712. A preferred output code results in C=D, meaning that the post-encoded state of the differential encoder 712 includes four zeroes also at the end of the message showing that the state of the encoder has been reset to the initial state of the differential encoder 712. By contrast, the examples illustrated in Case 5 through Case 8 do not result in resetting the post-encoded state of the differential encoder 712 to the initial pre-encoded state of the differential encoder 712.

TABLE III

| Example Bit Codes | |
|---|---|
| Case 1: | |
| A = 10111100111101110011000 | Pre-encoded message |
| C = 0000 | Previous state of the differential encoder |
| B = 100110100110001111000000 | Broadcast message |
| D = 0000 | Post-encoded state of the differential encode |
| Case 2: | |
| A = 10101111000100101010100000 | Pre-encoded message |
| C = 0000 | Previous state of the differential encoder |
| B = 10110011110101101000000 | Broadcast message |
| D = 0000 | Post-encoded state of the differential encoder |
| Case 3: | |
| A = 10101010110101101010000 | Pre-encoded message |
| C = 0000 | Previous state of the differential encoder |
| B = 10110100110100110000000 | Broadcast message |

TABLE III-continued

Example Bit Codes

| | |
|---|---|
| D = 0000 | Post-encoded state of the differential encoder |
| Case 4: | |
| A = 1011100001101100011000000 | Pre-encoded message |
| C = 0000 | Previous state of the differential encoder |
| B = 1001000001001111000000000 | Broadcast message |
| D = 0000 | Post-encoded state of the differential encoder |
| Case 5: | |
| A = 0111010000111000000010000 | Pre-encoded message |
| C = 0000 | Previous state of the differential encoder |
| B = 0110000000110101011111111 | Broadcast message |
| D = 1111 | Post-encoded state of the differential encoder |
| Case 6: | |
| A = 0011011101010010011110000 | Pre-encoded message |
| C = 0000 | Previous state of the differential encoder |
| B = 00111001111010111010010101 | Broadcast message |
| D = 0101 | Post-encoded state of the differential encoder |
| Case 7: | |
| A = 1001100101101011101000000 | Pre-encoded message |
| C = 0000 | Previous state of the differential encoder |
| B = 0110000000110101011111111 | Broadcast message |
| D = 1111 | Post-encoded state of the differential encoder |
| Case 8: | |
| A = 1100111110111001000000000 | Pre-encoded message |
| C = 0000 | Previous state of the differential encoder |
| B = 1111001101101111010101010 | Broadcast message |
| D = 1010 | Post-encoded state of the differential encoder |

In some embodiments, the super bit encoding concept can be extended to the idea of representing several Gray codes within a single communication satellite message burst such as an Iridium satellite message burst. The burst data structure includes information bits that provide identifying information as well as payload data, which is differentially encoded. In some embodiments there are 256 data bits (N) in a message burst in which multiple messages are to be transmitted, where n=8 or 256 possible messages. SBE sequences can be defined for a cases in which n=1 for use in a communications satellite differential decoder, using two 10 bit sequences to represent a 0 or a 1. In this case N=10 and n=1 and therefore the signal gain G=10.

Figure 9:
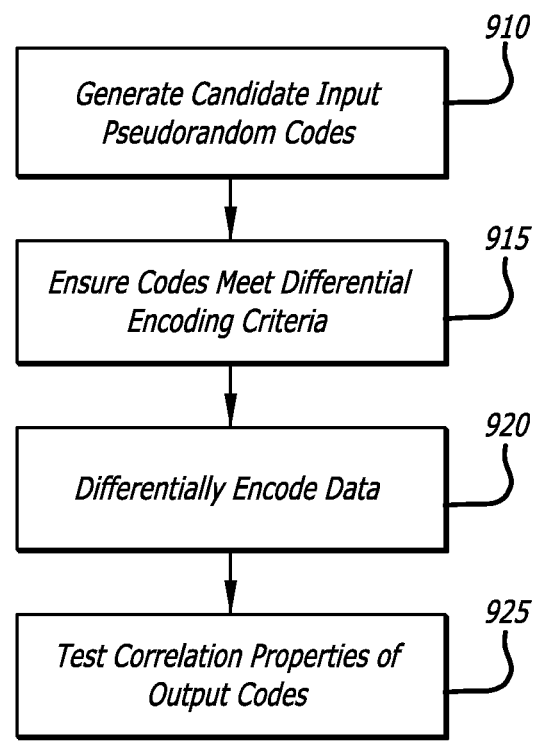
FIG. 9 is a flowchart illustrating operations in a method to generate codes for differential encoding operations, in accordance with at least one embodiment of the present disclosure.

FIG. 9 is a flowchart illustrating operations in a method to generate codes for differential encoding operations, according to embodiments. Referring to FIG. 9, at operation 910 candidate pseudo-random codes are generated. In some embodiments pseudo-random codes may be generated using a random number generator to create candidate bit sequences of 0s and 1s.

At operation 915 it is determined whether the pseudo-random codes meet differential encoding criteria. For QPSK encoding the pseudo-random code the number of bits must be even and the sum of all bits having a value of 1 must be an even multiple of four. For BPSK encoding the number of bits must be even and the some of all bits having a value of 1 must be an even multiple of two.

The pseudo-random code(s) may be input into the differential encoder 712, which differentially encodes data (operation 920) and generates an output from the input pseudo-random code(s). Differentially encoding a long random sequence of 0s and 1s typically produces a new code with similar statistical properties as the input code. Thus there is a high probability that the output code generated by the differential encoder 712 has similar properties as the input code.

At operation 925 the correlation properties of the output codes generated by the differential encoder 712 are tested by correlating the input code with the output code. In general, a good set of code words will produce a low cross-correlation between code words in the set. The operations of FIG. 9 may be repeated until a suitable set of code words is determined. The set of codes may then be used in the differential encoding process depicted in FIG. 8.

In summary, the forced differential encoding scheme implemented by satellite communications systems presents a difficulty in using pseudo-random code sequences in message encoding because for every input code for transmission results in four possible output code broadcasts. This significantly complicates the correlation processing in the user receiver by increasing the memory, processing, and power requirements. Furthermore, it weakens the separation between the codes and increases the likelihood that one code might be mistaken for another in the correlation process. According to embodiments described herein, encoding data in the differential encoder 712 using codes which leave the differential encoder 712 in a known output state may be useful in delivering pseudo-random coded messages to users via a communication satellite. Using these techniques, timing and frequency information can be delivered to a user in attenuated environments (e.g., indoors) by sending pseudo-random messages from a satellite such as Iridium to a user located inside a structure. The user receiving the message benefits because the broadcast from the communications satellite is more powerful than GPS, and the pseudo-random coding technique provides an additional gain that allows the signal to be pulled out of the noise. Once received, these messages can provide information suitable for the user to self-locate. However, without loss of generality, the message delivered to the user code could be for any purpose.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. A method for signal encoding, the method comprising:
transmitting, with at least one transmission source, separate burst signals separated by at least one time interval, wherein each of the burst signals includes more than one transmit bit transmitted on a respective frequency associated with each of the burst signals,
wherein each of at least one information bit is encoded to correspond to a specific predetermined sequence of the more than one transmit bit;
wherein each of the burst signals corresponds to one of the at least one information bit,
receiving, with at least one receiving source, the burst signals;

appending, with at least one processor, the burst signals to create a super burst signal, which provides a stronger code processing gain than provided by one of the burst signals; and processing, with the at least one processor, the more than one transmit bit from the super burst signal to obtain the at least one information bit.

2. The method of claim 1, wherein two or more of the burst signals are transmitted by a same transmission source.

3. The method of claim 1, wherein two or more of the burst signals are transmitted by different transmission sources.

4. The method of claim 1, wherein two or more of the burst signals are transmitted on a same frequency.

5. The method of claim 1, wherein two or more of the burst signals are transmitted on different frequencies.

6. The method of claim 1, wherein at least one user is associated with the at least one receiving source.

7. The method of claim 6, wherein the at least one user is at least one of an entity and a person.

8. The method of claim 6, wherein the at least one user is at least one of stationary and mobile.

9. The method of claim 1, wherein the at least one transmission source is employed in at least one of a satellite and at least one pseudo-satellite.

10. The method of claim 9, wherein the at least one satellite is at least one of a Lower Earth Orbiting (LEO) satellite, a Medium Earth Orbiting (MEO) satellite, and a Geosynchronous Earth Orbiting (GEO) satellite.

11. The method of claim 1, wherein two or more of the burst signals are transmitted over a same time interval.

12. The method of claim 1, wherein two or more of the burst signals are transmitted over different time intervals, wherein the different time intervals are one of predetermined and random.

13. The method of claim 1, wherein the at least one information bit corresponds to a sequence of two or more of the transmit bits that are received in at least one of chronological order and not in chronological order.

14. The method of claim 13, wherein the sequence of the transmit bits that corresponds to the at least one information bit is at least one of predetermined and random.

15. A system for signal encoding, the system comprising:
at least one transmission source for transmitting separate burst signals separated by at least one time interval,
wherein each of at least one information bit is encoded to correspond to a specific predetermined sequence of more than one transmit bit,
wherein each of the burst signals corresponds to one of the at least one information bit,
wherein each of the burst signals includes the more than one transmit bit transmitted on a respective frequency associated with each of the burst signals;
at least one receiving source for receiving the burst signals; and
at least one processor for appending the burst signals to create a super burst signal, which provides a stronger code processing gain than provided by one of the burst signals, and for processing the more than one transmit bit from the super burst signal to obtain the at least one information bit.

16. The system of claim 15, wherein at least one user is associated with the at least one receiving source.

17. The system of claim 16, wherein the at least one user is at least one of an entity and a person.

18. The system of claim 16, wherein the at least one user is at least one of stationary and mobile.

19. The system of claim 15, wherein the at least one transmission source is employed in at least one of a satellite and at least one pseudo-satellite.

20. The system of claim 19, wherein the at least one satellite is at least one of a Lower Earth Orbiting (LEO) satellite, a Medium Earth Orbiting (MEO) satellite, and a Geosynchronous Earth Orbiting (GEO) satellite.

21. The system of claim 15, wherein two or more of the burst signals are transmitted over a same time interval.

22. The system of claim 15, wherein two or more of the burst signals are transmitted over different time intervals, wherein the different time intervals are one of predetermined and random.

23. The system of claim 15, wherein the at least one information bit corresponds to a sequence of two or more of the transmit bits that are received in at least one of chronological order and not in chronological order.

24. The system of claim 23, wherein the sequence of the transmit bits that corresponds to the at least one information bit is at least one of predetermined and random.

* * * * *